United States Patent [19]

Stahl

[11] Patent Number: 4,715,459
[45] Date of Patent: Dec. 29, 1987

[54] DRIVE FOR VEHICLES

[75] Inventor: Leo Stahl, Hub-Busswil, Switzerland

[73] Assignee: Leo Stahl AG, Busswil, Switzerland

[21] Appl. No.: 877,252

[22] Filed: Jun. 23, 1986

[30] Foreign Application Priority Data

Jun. 26, 1985 [CH] Switzerland ............... 2741/85

[51] Int. Cl.$^4$ .......................................... B62D 11/04
[52] U.S. Cl. ................................. 180/6.48; 180/307
[58] Field of Search .............. 180/6.48, 291, 299, 180/305, 307

[56] References Cited

U.S. PATENT DOCUMENTS 3,897,840  8/1975  Molzahn et al. ............... 180/6.48
4,369,855  1/1983  Buschbom et al. ............. 180/6.48

Primary Examiner—David M. Mitchell
Assistant Examiner—Donn McGehan
Attorney, Agent, or Firm—Helfgott & Karas

[57] ABSTRACT

A vehicle has articulated tracks on each side driven separately by hydraulic gears comprising a hydraulic group coupled to the drive shaft and hydraulic motors driving the tracks. The hydraulic pump group has at least three hydraulic pumps coupled to each other in series. The hydraulic motors are actuated by the first two hydraulic pumps. The third pump is adapted to actuate auxiliary equipment and is serially engagable and disengagable from the first two pumps.

9 Claims, 3 Drawing Figures

DRIVE FOR VEHICLES

BACKGROUND OF THE INVENTION

The present invention relates generally to a drive for a vehicle and more particularly to an automotive vehicle having a travelling gear including wheels or articulated treads or tracks.

In prior art vehicles of the type to which the present invention is directed, the travelling gear was driven by a drive unit via a hydraulic gearing arrangement. Usually, there was provided at least one hydraulic gear for each side of the travelling gear. The multiplication factor for one side of the travelling gear was adjustable for both the functions of driving and steering. The multiplication factor for one side of the travelling gear was independent of the multiplication factor of the other side of the travelling gear.

Vehicle drives of the aforementioned type are, in particular, used in special vehicles, such as snow clearing machines, runway maintenance vehicles, military vehicles and those used in the building or construction industry and the like. In the prior art, the transmission of power from the drive unit to the travelling gear was frequently accomplished by means of a hydraulic gearing arrangement. Associated with each side of the travelling gear was at least one hydraulic gear, for example of the type described in U.S. Pat. No. 4,116,292. The prior art arrangement made it possible to increase or decrease the vehicle driving speed when a simultaneous and identical change to the multiplication factor was made to both travelling gear sides. However, for steering, the multiplication factor of the hydraulic gears were modified in the opposite way leading to unequal speeds on the two vehicle sides. This resulted in a steering movement being initiated. In the case of articulated or full-track vehicles this type of steering arrangement was generally adopted. However, it was also used for wheeled vehicles having no special steering shaft with steering wheels.

In its simplest construction, the hydraulic gearing arrangement of the prior art had two hydraulic gears, one for each vehicle side. The prior art hydraulic gearing arrangement included a hydraulic pump, a hydraulic motor and all necessary auxiliary units, such as a feed pump, an oil container, an oil filter, etc.

It is known from the prior art to drive two hydraulic pumps and feed pumps with a drive unit that is generally a thermal motor having a toothed gearing, which is constructed as a distribution gear and which has two or three output shafts. However, this solution is not advantageous because a distribution gear constructed as toothed gearing loses power and this power loss can amount to several per cent per pair of gears.

When the distribution gear constructed as toothed gearing is fixed to the drive unit and the drive unit is itself resiliently or elastically mounted, dimensional changes occur between the hydraulic pump and the hydraulic motor. The change of spacing between the pump and the motor does not permit the use of fixed lines such as steel pipe lines. While high pressure hoses which are able to withstand the pressures occurring in such hydraulic gears are known in the prior art, the operational reliability of such hose lines is much lower than that of fixed metal pipe lines.

SUMMARY OF THE INVENTION

The problem addressed by the present invention is to construct a drive for vehicles of the aforementioned type such that the power losses that occur with the known hydraulic gearing arrangements are reduced.

A related object of the present invention is to provide that the operational reliability of such arrangements is increased.

According to the present invention the problem encountered by prior art arrangements is solved in that the hydraulic pumps of the hydraulic gear are coupled to one another in serial relationship. That is one hydraulic pump is coupled by one end of its shaft to the drive unit. The other, opposite end of the first hydraulic pump shaft is coupled to one end of the shaft of the following or second hydraulic pump. The second end of the shaft of the second hydraulic pump is coupled to one end of the shaft of the third hydraulic pump. One end of the shaft of the last hydraulic pump is coupled to the second end of the shaft of the next-to-last hydraulic pump. Thus, there is no need for a distribution gear between the drive unit and the hydraulic pumps. Also, a fixed spacing can be maintained between the hydraulic pump and hydraulic motor of the hydraulic gear and consequently the hydraulic gear pressure lines can be constructed as fixed, rigid pipe lines which can be made of a suitable metallic material.

BRIEF DESCRIPTION OF THE DRAWINGS

The invention is described in greater detail hereinafter relative to a non-limitative embodiment and the attached drawings, wherein like reference characters designate like parts.

In the drawings

DETAILED DESCRIPTION OF THE INVENTION

Figure 1:
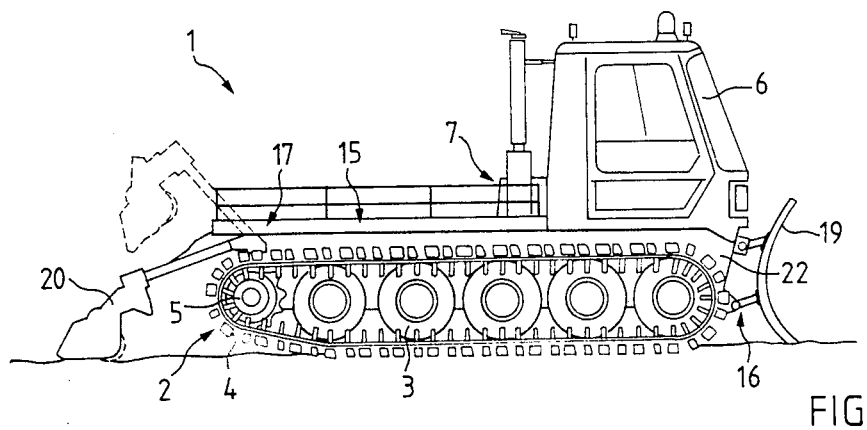
FIG. 1 is a diagrammatic and schematically illustrated track vehicle such as a runway maintenance vehicle.

The vehicle designated generally by the reference character 1 shown in FIG. 1 has a travelling gear generally designated as 2 and which, for purposes of illustration is constructed as a track driving gear. Each side of the travelling gear 2 has a track 4 that is guided on rollers or wheels 3. The track 4 is driven by a driving gear 5.

As shown in FIG. 1, the vehicle 1 has a cab 6, which partly houses a drive unit that is not illustrated. The rear part 7 of the drive unit projects out of the back of cab 6 and has a driven shaft 10 shown in FIG. 2. The driven shaft 10 is preferably connected via a flexible coupling 11 to a drive shaft 12 of a hydraulic pump group 15 that is not visible in FIG. 1 but which is shown in detail in FIGS. 2 and 3.

On the front and the back of vehicle 1 there are provided fixing and lifting means generally designated as 16 and 17, respectively, on which can be arranged equipment of various types. As shown in FIG. 1, a plough share 19 is mounted securely on the fixing and lifting means 16, while a runway cutter 20 is coupled to the fixing and lifting means 17. The vehicle 1 also has all the additional means necessary for driving and steering the vehicle. The cab 6, the drive unit which is not illustrated, the hydraulic pump group 15 and the travelling gear 2 are arranged on a chassis 22 of standard construction which need not be described.

Figure 2:
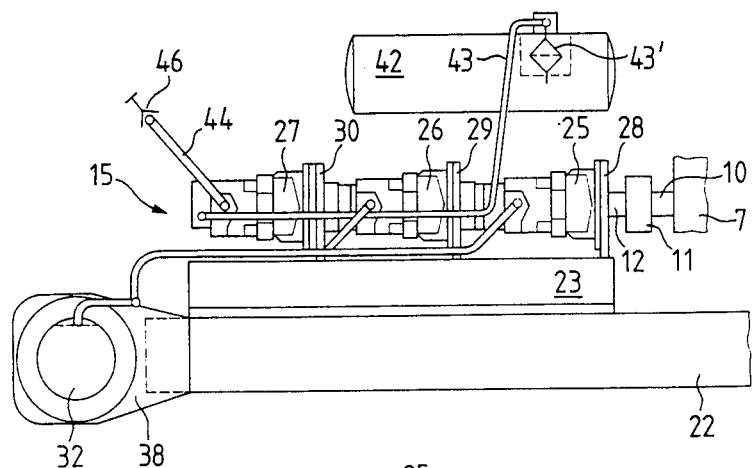
FIG. 2 is a diagrammatic and schematically illustrated side view of a hydraulic pump group of a hydraulic gearing arrangement for the vehicle of FIG. 1 in accordance with the teaching of the present invention.
Figure 3:
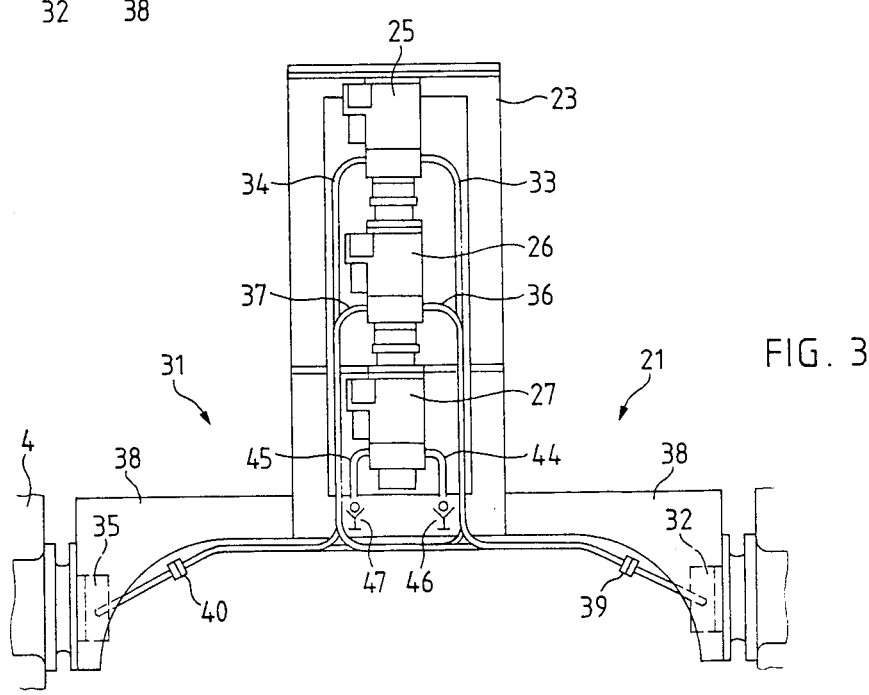
FIG. 3 is a diagrammatic and schematically illustrated plan view of the hydraulic pump groups shown in FIG. 2.

The hydraulic pump group 15 is supported on a common frame 23, which is, in turn, detachably fastened to the chassis 22, preferably by screws or other comparable means. Each of the the three hydraulic pumps 25, 26 and 27 on the frame 23 is mounted on a bracket 28, 29, and 30, respectively, which is supported on the common frame 23. As can be seen in FIGS. 2 and 3, the hydraulic pumps 25, 26 and 27 are successively arranged in series and are coupled end-to-end to one another via their respective pump shafts. The hydraulic pump 25 forms the primary part of a hydraulic gear generally designated by the reference character 21 in FIG. 3 which drives the right-hand side of the travelling gear 2. Hydraulic pump 26 forms the primary part of a second hydraulic gear generally designated by the reference character 31 in FIG. 3. and is used for driving the left-hand side of the gear 2. The hydraulic gear for the right-hand side of the travelling gear 2 thus essentially comprises the hydraulic pump 25 and a hydraulic motor 32 as, the secondary part with the two parts 25 and 32 being fluidly and mechanically interconnected by pressure lines 33 and 34.

In the same manner, the hydraulic gear 31 for driving the left-hand side of travelling gear 2 comprises the hydraulic pump 26 and a hydraulic motor 35 with the two parts 26 and 35 being fluidly and mechanically interconnected by pressure lines 36 and 37.

FIGS. 2 and 3 show the hydraulic pumps 25, 26 and 27 and their respective hydraulic motors 32 and 35 in the form of axial piston units. However, it should be understood that it is also possible to use other units such as radial piston units in place of axial piston units.

The hydraulic pump 27, which is furthest from the drive unit (not illustrated), is used for the operation of disengageable additional means such as a cutter or a cable winch. The hydraulic pump 25 is connected to the hydraulic pump 26 by a coupling (not shown), which cannot be disengaged in operation. By way of contrast, an engageable and disengageable clutch (not shown), is provided between the hydraulic pump 26 and the hydraulic pump 27. The clutch between the hydraulic pump 26 and the hydraulic pump 27 can be an electromagnetic toothed clutch, such as is supplied by Ortlinghaus AG, Zug. However, it would also be possible to use other hydraulically or pneumatically engageable clutches from the same or a different manufacturer. The clutch between the hydraulic pump 25 and the hydraulic pump 27 can be a non-engageable toothed clutch.

As is particularly shown in FIG. 3, the common frame 23 has two outwardly and oppositely projecting carriers or arms 38, which project downwardly as shown in FIG. 2 and which carry or support hydraulic motors 32 and 35. The driving wheel 5 on one side of the travelling gear 2 is secured, preferably by means of a reduction gear to the respective output shaft 10 of hydraulic motors 32 and 35. Due to the fact that the hydraulic motors 32 and 35 are mounted on the carriers 38, which form a part of frame 23, the pressure lines 33, 34, 36, and 37 can be constructed as fixed rigid pipe lines, such as steel pipes because, as a result of rigidity of the common frame 23 for the hydraulic pumps and motors, no spacing changes occur between the primary and secondary parts of the two hydraulic gears 21 and 31. However, even if the hydraulic motors 32 and 35 are mounted directly on the chassis 22 and not on the carriers or arms 38, fixed metal pipes can be used as the pressure lines, because the frame 23 is secured to the chassis 2 instead of being movably connected thereto. If bolted pipe joints 39 and 40 are provided in the pressure pipes 33 and 34 of the two hydraulic gears, the hydraulic pump unit 15 can be individually dismantled and removed from the vehicle. This makes it possible to easily overhaul or repair the hydraulic motors 32 and 35.

However, even if, in accordance with FIG. 3, the hydraulic motors 32 and 35 are mounted on the common frame 23, the complete hydraulic gearing arrangement can be detached from the chassis 22 and removed from the vehicle with limited dismantling work.

Obviously the hydraulic pump groups 15 have all of the auxiliary units necessary for operation. It can be seen in FIG. 2 that an oil container 42 is positioned above the hydraulic pump group 15. The waste oil and the cooling oil diverted from the pressure lines 36 and 37 which are under low pressure are returned via a line 43 to the oil container 42, where cleaning thereof takes place in a filter 43'. The feed pump or pumps necessary for the hydraulic pump group 15 can be coupled directly to the hydraulic pumps or it is possible to provide for this purpose a separate feed pump group. The hydraulic pump 27 used for operating the additional equipment is provided in its two pressure pipes 44 and 45, pipe couplings 46 and 47 which are represented diagrammatically in FIG. 3. These can be well known quickaction couplings, which act as closing valve upon separating the pressure pipes 44 and 45.

In the series connection arrangement of the hydraulic pumps according to FIGS. 2 and 3, the impression could arise that the hydraulic pump 25 positioned immediately behind the drive unit would be overloaded. In this connection it should be noted that when cornering, when one side of the travelling gear is stationary, substantially the entire power is transferred via one of the hydraulic gears 21 or 31, so that the shaft of the hydraulic pump 25 must be designed for this power. When travelling straight ahead the hydraulic pump 25 is once again not subject to an increased power, because here again only the full motor power of the hydraulic pump group 15 is supplied. Unlike when cornering, each hydraulic pump 25, 26 only has to transfer half the power. If the hydraulic pump 27 is used, there is little or no loading of the hydraulic gear, so that here again there can be no overloading of the hydraulic pumps 25 and 26.

The above-described hydraulic gearing arrangement has the advantage compared with known gearing arrangements that, due to the series connection of the hydraulic pumps 25, 26 and 27 a distribution gear is superfluous and consequently the power loss of the distribution gear is obviated. In addition, the hydraulic pump 25 can be directly and preferably elastically connected to the driven shaft 10 of the normally flexibly mounted drive unit, so that the frame 23 can be fixed to the chassis 22. This leads to the advantage that fixed distances exist between the hydraulic pumps and the hydraulic motors thereby enabling metal pipe lines such as steel to be used, whose operational reliability significantly exceeds that of the otherwise conventional hydraulic hoses. This makes it possible to largely prevent breakdowns during the operation of the vehicle, so that there is no dirtying of the ground. Also the hydraulic oil loss costs are reduced.

Furthermore, as a result of the present hydraulic gearing arrangement, maintenance costs are reduced, because either the hydraulic pump group 15 or the complete hydraulic gearing arrangement can be easily detached from the vehicle and removed, which achieves the prerequisite for good maintenance, namely good accessibility to the parts of the hydraulic gearing arrangement.

What is claimed is:

1. A drive for a vehicle with a travelling gear, in which the travelling gear is driven by a drive unit via a hydraulic gearing arrangement including at least one hydraulic gear with pump means for each side of the travelling gear, the mulitplication factor for one side of the travelling gear being adjustable for driving and steering independently of the other side of the travelling gear, the hydraulic pump means of the hydraulic gear comprising first and second hydraulic pump means coupled in series with one another said first hydraulic pump means being coupled by a first end of its shaft to the drive unit and by the second opposite end of its shaft to the first end of the shaft of a following second hydraulic pump means, at least a third hydraulic pump means also coupled in series with the hydraulic pump means for said travelling gear, the second end of the shaft end of the following second, hydraulic pump means being coupled to the first end of the shaft of the third hydraulic pump means, the last hydraulic pump means having the first end of its shaft engagable and disengagable from the second end of the shaft of the next-to-last hydraulic pump means by means of a clutch.

2. The drive according to claim 1, wherein at least said hydraulic pump means of said hydraulic gear of each side of said travelling gear are fixed to a common frame supported on a chassis of said vehicle, said hydraulic gears being constructed as remote gears whose hydraulic pumps are connected to hydraulic motors via pressure lines.

3. The drive according to claim 2, wherein said hydraulic motors are fixed to said common frame and at least said pressure lines of the hydraulic gears are metal pipe lines.

4. The drive according to claim 3, wherein said pipe lines are rigid.

5. The drive according to claim 3, wherein said pipe lines are steel.

6. The drive according to claim 2, wherein said hydraulic motors are mounted on said chassis.

7. The drive according to claim 3, wherein at least said pressure lines have at least one pipe joint subdividing said pipe lines into pipe line parts whereby when said pipe line parts are separated, said common frame, together with said hydraulic pump means can be removed from said chassis.

8. The drive according to one of the claims 1, wherein said last hydraulic pump means, when viewed from said drive unit, is intended for driving auxiliary equipment, each said pressure pipe lines of said last hydraulic pump means containing one pipe joint.

9. The drive according to claim 8, wherein said pipe joint includes a closing valve.

* * * * *